Patented Oct. 31, 1939

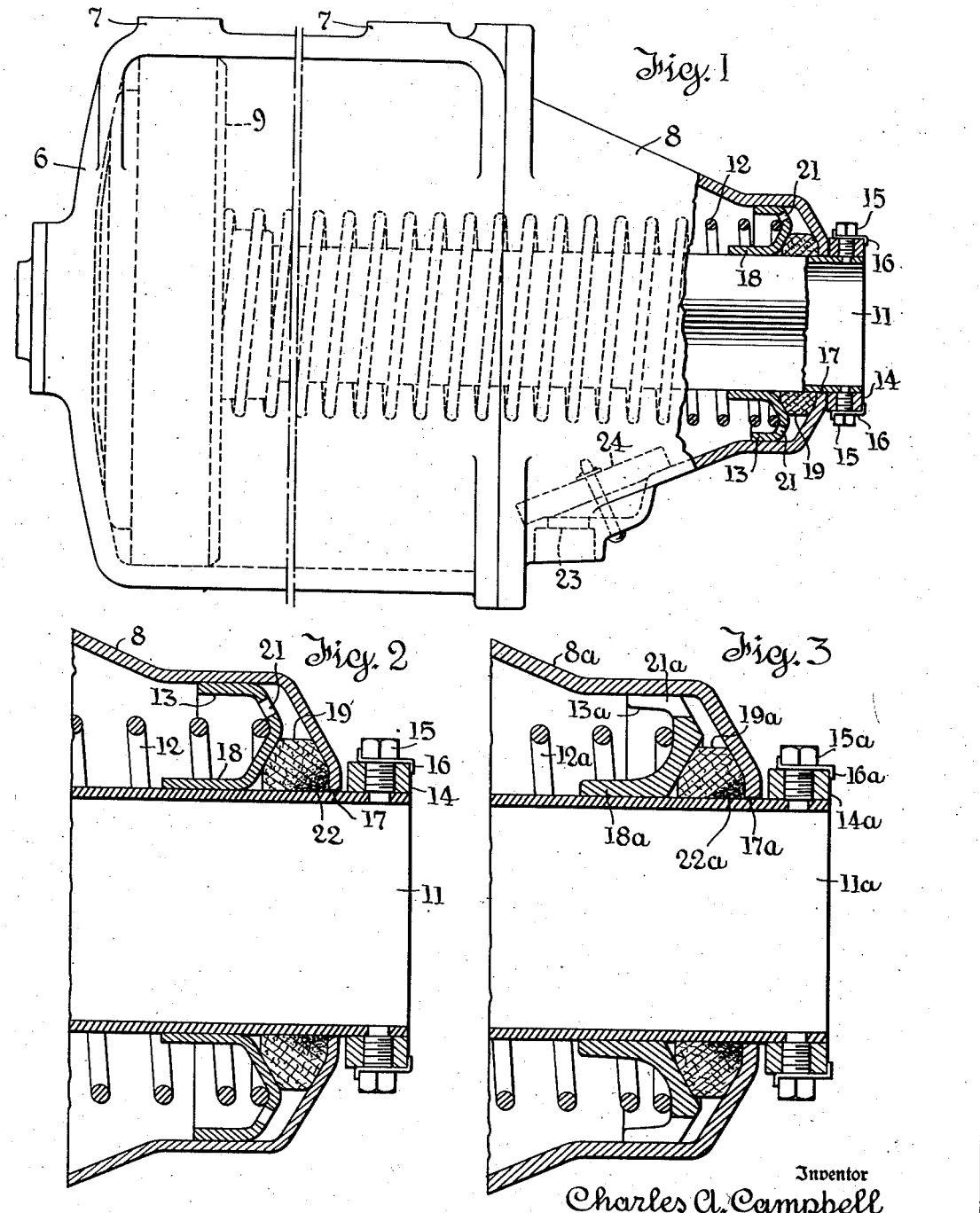

2,177,767

UNITED STATES PATENT OFFICE 2,177,767

AIR BRAKE

Charles A. Campbell, Watertown, N. Y., assignor to The New York Air Brake Company, a corporation of New Jersey Application November 21, 1938, Serial No. 241,706

6 Claims. (Cl. 303—88)

This invention relates to air brakes, and particularly to means for preventing the entrance of dust around the piston rod guides of brake cylinders.

In recent years the demand for a higher standard of brake performance on railroad trains has led to the adoption of devices intended to prevent the entrance of dust and grit around the tubular piston rod into the brake cylinder. The purpose was to reduce the wear on the packing leather of the piston and thus reduce brake cylinder leakage. The problem is complicated by the fact that such a device can be given only limited maintenance attention and consequently must be effective and highly durable.

The first scheme to go into extensive commercial use involved what was virtually a packed grease lubricated joint with metallic scraping rings designed to remove mud and grit from the rod as it returned through the guide during a release of the brakes.

These devices have demonstrated convincingly the value of dust exclusion, but their initial cost has been undesirably high, wear has proved to be unexpectedly severe and dust exclusion after even moderate wear is unsatisfactory. The primary source of trouble seems to be that the grease used for lubrication causes dust to adhere and the adhering dust causes rapid destructive wear of the excluder.

In the meantime a radical change in braking practice has commenced and is already increasing greatly the need for an efficient dust excluder on passenger trains. This is the practice of mounting a plurality of brake cylinders (sometimes as many as four) directly on the truck instead of using one brake cylinder per car, such brake cylinder being mounted beneath the car body. The effect of truck mounting is to bring the brake cylinder close to the roadbed and hence into a very dusty zone, and at the same time to increase the number of units which must be protected. Consequently, the need for the dust excluder is increased and the economic importance of an inexpensive dust excluder is emphasized.

Applicant has become convinced that the conditions of service are so severe, and the possible maintenance is so poor, that a packed joint around the push rod is impracticable. Hence some other solution must be found.

The present invention is based on abandonment of a packed joint altogether, and the substitution for packing of a porous filter. This filter is preferably made of felt and the follower which clamps the filter around the rod is so formed as to cause air flow through the felt filter in preference to flow between the felt filter and the rod. The theory underlying this is that the filter must trap fine dust when air flows inwardly during the release of the brakes and support this dust so that all or most of it will be blown out during the next brake application.

The effect is to prevent progressive accumulation of dust in the filter. Experience has demonstrated that the filter retains a small quantity of fine dust in the outer surface zone, the quantity being so small that it serves merely to keep the rod burnished without causing any appreciable wear.

To demonstrate the operating characteristics of filter type excluders two cylinders were mounted on the same truck, in comparable positions one cylinder equipped with the prior art excluder and the other with the filter type of excluder. This permitted comparison while operating simultaneously under conditions which were as near identical for both devices as could be had. This test under actual service on the road has demonstrated that the prior art excluder will be worn to destruction before the filter type of excluder shows any appreciable wear. The tests were made in high speed service and over road bed where dust and grit conditions are notoriously bad, so that the utility of the filter type of excluder is clearly established.

Preferred embodiments of the invention will now be described with reference to the accompanying drawing in which—

Fig. 1 is an elevation of a brake cylinder having the invention applied, parts being broken away to show the construction of the piston rod guide.

Fig. 2 is a fragmentary view of the piston rod guide shown in axial section on an enlarged scale and indicating how dust is trapped in the filter ring.

Fig. 3 is a view similar to Fig. 2 but showing a modified construction.

Referring to Fig. 1, 6 represents the brake cylinder which is provided with mounting pads 7. The part 8 is the so-called non-pressure head which carries the piston rod guide. The piston is indicated in dotted lines at 9 and is rigidly connected with the tubular piston rod 11. The return spring 12 surrounds the tubular piston rod and reacts between the piston 9 and a follower 13 here shown as formed of pressed steel.

Inward motion of the tubular piston rod 11 is limited by a stop ring 14 which is held in place by staking screws 15 each provided with a lock washer 16. The ring 14 arrests inward motion so that the piston 9 does not go clear to the cylinder head and so the ring 14 acts to protect the rod guide when the piston is in brake releasing position as shown in Fig. 1.

The opening in the non-pressure head 8 indicated at 17 is slightly larger than the tubular piston rod 11 and does not guide the rod. On the contrary the rod is guided by a sleeve-like portion 18 of the follower 13 and the follower is guided in the non-pressure head 8. The forward end of the non-pressure head 8 and the forward face of the follower 18 are so shaped as to afford a generally triangular chamber in which is mounted the filter ring 19. The ring 19 is formed of a good grade of felt which may be chemically treated to resist water. The felt ring is initially rectangular in cross section so that when it is in its operative position as indicated in the drawing its outer periphery is much more closely compressed than is its inner portion which contacts the tubular rod 11.

The follower is ported at 21 and these ports are outside the outer periphery of the filter ring. Since the return spring 12 reacts against the follower 13 this spring serves to develop on the filter the desired compressive stress.

The effect is to compress the filter quite markedly particularly in its outer marginal region and to crowd it against the tubular rod 11 so that air entering at 17 will not flow between the felt ring and the rod but will flow outwardly obliquely through the ring toward the ports 21. From this it follows that any dust entering with the air will be trapped by the felt ring. In Fig. 2 the shading 22 indicates dust trapped in the felt ring.

While the felt ring 19 serves to a limited extent as a breather it is not desired to emphasize this effect and consequently use is made of the customary breather port indicated at 23 the port being protected by a dust arresting filter disc indicated in dotted lines at 24. This filter disc and breather conform to the construction shown in my Patent No. 2,135,100, November 1, 1938.

In Fig. 3 a slightly modified construction is shown in which the follower is formed by casting instead of being formed of pressed steel. Parts in Fig. 3 which correspond to parts in Figs. 1 and 2 are given the same reference numbers with the distinguishing letter a. The essential difference is that the ports 21a take the forms of peripheral grooves or flutes.

The important characteristic of the construction described is, that while the felt ring does to a certain extent retard the flow of air, it is not a packing and does not form a packed joint. On the contrary it serves to a limited extent as a breather which traps any dust entering with inflowing air and later tends to reject and discharge such dust when the air current reverses and flows outward.

As a consequence the felt is effective to resist the entrance of dust. The small amount of dust which remains in the felt is only moderately abrasive. Consequently the tubular rod 11 is not subjected to severe wear though the dust in the felt ring does serve, where the cars are continuously in service, to keep the tubular piston rod burnished and smooth.

Consequently the rod operates satisfactorily without any lubrication and the absence of lubrication virtually eliminates the tendency of dust and grit to adhere to the rod.

What is claimed is:

1. The combination of a brake cylinder having a head structure including a piston rod guide; a piston having a rod extending through said guide, said piston dividing the cylinder into a working space in which brake actuating pressures are developed, and an idle space on the rod side of the piston to and from which the piston tends to draw and displace atmospheric air as it moves; and a dust excluder associated with said rod guide and comprising a fibrous filter ring seating against said rod and guide and flow directing means for causing air flow tending to occur between said rod and guide to pass through said filter ring.

2. The combination of a brake cylinder having a head structure including means forming a piston rod guide with associated gland and follower; a piston having a rod extending through said guide, said piston dividing the cylinder into a working space in which brake actuating pressures are developed, and an idle space on the rod side of the piston to and from which the piston tends to draw and displace atmospheric air as it moves; a dust excluder mounted in said gland, associated with said rod guide and comprising a fibrous filter ring seating against said rod; and yielding means reacting in the follower to compress the filtering, the gland and follower being so formed as to wedge the ring toward the rod and to favor flow through the filter of air tending to flow between the rod and guide.

3. The combination defined in claim 1 on which the filter is a felt ring.

4. The combination defined in claim 1 on which the filter is a ring of felt treated to repel water.

5. The combination defined in claim 2 in which the filter is a ring of felt which prior to compression by the follower is approximately rectangular in cross section, whereby the wedging action exerted thereon compresses the outer peripheral portion of the ring more markedly than the inner portion.

6. The combination with the structure of claim 1 of flow retarding means for permitting a breathing flow of air to and from said idle space, whereby the tendency of air to flow between the rod and guide is reduced.

CHARLES A. CAMPBELL.

CERTIFICATE OF CORRECTION.

Patent No. 2,177,767.                                        October 31, 1939.

CHARLES A. CAMPBELL.

It is hereby certified that error appears in the printed specification of the above numbered patent requiring correction as follows: Page 2, second column, line 40, claim 2, for the word "filtering" read filter ring; and that the said Letters Patent should be read with this correction therein that the same may conform to the record of the case in the Patent Office.

Signed and sealed this 5th day of November, A. D. 1939.

(Seal)                                                        Henry Van Arsdale,
Acting Commissioner of Patents.